United States Patent
Lyakas et al.

(10) Patent No.: US 10,885,017 B2
(45) Date of Patent: Jan. 5, 2021

(54) MULTIPLE TRANSACTIONS IN A SINGLE KV STORE

(71) Applicant: Zadara Storage, Inc., Irvine, CA (US)

(72) Inventors: Alex Lyakas, Haifa (IL); Shyam Kaushik, V, Bangalore (IN)

(73) Assignee: Zadara Storage, Inc., Irvine, CA (US)

( * ) Notice: Subject to any disclaimer, the term of this patent is extended or adjusted under 35 U.S.C. 154(b) by 151 days.

(21) Appl. No.: 15/726,178

(22) Filed: Oct. 5, 2017

(65) Prior Publication Data

US 2019/0108252 A1  Apr. 11, 2019

(51) Int. Cl.
| | | |
|---|---|---|
| G06F 16/23 | (2019.01) | |
| G06F 16/27 | (2019.01) | |
| G06F 16/22 | (2019.01) | |
| G06F 9/46 | (2006.01) | |

(52) U.S. Cl.
CPC .......... *G06F 16/2365* (2019.01); *G06F 9/466* (2013.01); *G06F 16/2246* (2019.01); *G06F 16/2379* (2019.01); *G06F 16/27* (2019.01)

(58) Field of Classification Search
CPC .. G06F 16/2365; G06F 16/2379; G06F 16/27; G06F 16/2246; G06F 9/466; G06F 16/9024; G06F 16/2358; G06F 16/9027
See application file for complete search history.

(56) References Cited

U.S. PATENT DOCUMENTS

| 6,792,432 B1 * | 9/2004 | Kodavalla | G06F 16/2308 |
| 9,799,017 B1 * | 10/2017 | Vermeulen | G06F 16/285 |
| 2014/0379638 A1 * | 12/2014 | Li | G06F 16/27 |
| | | | 707/610 |
| 2015/0032694 A1 * | 1/2015 | Rajamani | G06F 16/2358 |
| | | | 707/625 |
| 2015/0032695 A1 * | 1/2015 | Tran | G06F 16/273 |
| | | | 707/625 |

(Continued)

OTHER PUBLICATIONS

Aguilera, "A Practical Scalable Distributed B-Tree," Proceedings of VLBD Endowment, vol. 1, No. 1, Aug. 1, 2008, pp. 598-609, XP055559644, New York, NY.

(Continued)

*Primary Examiner* — Robert W Beausoliel, Jr.
*Assistant Examiner* — Mohammad Solaiman Bhuyan

(57) ABSTRACT

A method is provided for a key-value (KV) store database management system (DBMS) to provide a KV store to an application. The method includes providing a low-level KV store and a top-level KV store each having its own distinct transaction. The low-level KV store includes key-value pairs. The top-level KV store includes information leading to the low-level KV store. The information in the top-level KV store includes a minimum key in the low-level KV store, a last committed transaction for the low-level KV store, and a pointer to a root node of the low-level KV store. The method further includes committing a current transaction for the low-level KV store by persisting changes during the current transaction for the low-level KV store to secondary memory, updating the information of the top-level KV store with the current transaction for the low-level KV store as the last committed transaction for the low-level KV store, and opening a new transaction for the low-level KV store.

18 Claims, 9 Drawing Sheets

(56) References Cited

U.S. PATENT DOCUMENTS

2018/0011893 A1* 1/2018 Kimura .............. G06F 16/9027

OTHER PUBLICATIONS

EPO as ISA for PCT/US2018/052541, "International Search Report and Written Opinion," dated Mar. 7, 2019, 11 pages.
Mitchell et al., "Balancing CPU and Network in the Cell Distributed B-Tree Store Balancing CPU and Network in the Cell Distributed B-Tree Store," Proceedings of the 2016 USENIX Annual Technical Conference, pp. 451-464, Jan. 1, 2016, Denver, CO.
Woon-Hak Kang et al., "Durable Write Cache in Flash Memory SSD for Relational and NoSQL Databases." Proceedings of the 2014 ACM Sigmod International Conference on Management of Data, Sigmod '14, Jun. 18, 2014, pp. 529-540, XP055543276, New York, NY, USA.

* cited by examiner

MULTIPLE TRANSACTIONS IN A SINGLE KV STORE

FIELD OF INVENTION

This invention relates to key-value stores, and more particularly to maintaining multiple transactions in a single key-value store.

DESCRIPTION OF RELATED ART

A key-value (KV) store can be viewed as a simple database. Unlike a structured query language (SQL) database, which arranges its data into tables and columns, a KV store is just a collection of key-value pairs. A key can be anything, e.g., an integer or a string. The only requirement is that the KV store knows how to compare any two keys. A value can also be anything, and the KV store treats it as a binary large object (BLOB). The only requirement is that KV store knows the size of a value so it can store it on disk.

Typically a KV store operates by transactions. A new transaction is opened when an application wants to perform some modification on the KV store, such as inserting a new key. Later, additional changes can be made on behalf of this transaction. At some point, the KV store decides that the running transaction has accumulated enough changes. KV store then commits the running transaction so all modifications on behalf of it are persisted on disk. Now a new transaction can be opened. Each transaction has some kind of transaction ID, such as a monotonically increasing integer.

A transaction cannot commit while there are application threads still joined to it. Only once all application threads have detached from the transaction, it can start committing. Typically, an application thread is attached to a transaction for a very short time—only to perform the in-memory modifications to the KV store.

A KV store may be implemented as a B-tree (e.g., a B+ tree). A B-tree is a built of tree blocks layered in several levels. The tree blocks include leaf nodes and index nodes. Leaf nodes contain keys and values that the KV store manages. Index nodes contain pointers to lower-level tree blocks, which may be other index nodes or leaf nodes.

All the key-value pairs stored in a B-tree are sorted, typically in ascending order. This means that index and leaf nodes on the "left" parts of the tree carry lower keys than index and leaf nodes on the "right" parts of the tree. Within a leaf node, key-value pairs are also sorted by key. Index nodes have their children pointers also sorted by key.

Searching for a key-value pair in a B-tree starts from the root node, and then follows relevant index nodes to eventually reach the relevant leaf node, in which the required key and value might be located. Since each tree block is located on disk, every "jump" to a lower level requires reading the relevant tree block from disk.

B-tree typically has very few levels so it is very wide, i.e., each index node has a large number of child blocks. The result is that searching for a key traverses a very small number of tree blocks so the amount of disk reads needed to find a key is very small. The size of a tree block is typically few kilobytes (KBs), for example, 4 KB, 16 KB or 32 KB.

SUMMARY

In one or more examples of the present disclosure, a KV store is structured as several low-level stores (hereafter "sub-KV stores") and a top-level store (hereafter "root of sub-KV stores"). Each sub-KV store is responsible for a particular range of keys.

Each sub-KV store has its own running transaction. The root of sub-KV stores also has its own running transaction. The root of sub-KV stores tracks super-blocks of the sub-KV stores. A sub-KV store's super-block carries information to locate, parse, and validate the sub-KV store content on disk, such as the coordinate of the sub-KV store content on disk, the length of the content, the checksum of the content, and the transaction ID of the sub-KV store.

In the KV store, changes are accumulated against the sub-KV stores. A sub-KV store decides independently to commit changes when it has accumulated enough changes, thereby avoiding write amplification or other overheads in persisting changes cross the whole KV store.

From the application perspective, there is only one KV store. The application is not aware of the internal separation of key range into smaller ranges handled by the sub-KV stores.

In one or more examples of the present disclosure, the sub-KV stores are created and deleted dynamically as key-value pairs are inserted and removed from the KV store. When key-value insertion causes the number of keys maintained by a sub-KV store to exceed an upper threshold, the sub-KV store is split into two sub-KV stores with approximately half of the keys. When key-value deletion causes the total number of keys maintained by adjacent sub-KV stores to fall below a lower threshold, the adjacent sub-KV stores are merged into one sub-KV store. In some examples, the adjacent sub-KV stores are merged by taking the key-value pairs from one sub-KV store and merging them into the other sub-KV store and deleting the empty sub-KV store.

BRIEF DESCRIPTION OF THE DRAWINGS

Use of the same reference numbers in different figures indicates similar or identical elements.

DETAILED DESCRIPTION OF THE INVENTION

Assume X random keys are to be updated with new values in a KV store, it may happen that a leaf node A has many of its key-value pairs updated but a leaf node B has only one of its key-value pairs updated. Further assume that the KV store decides to commit the running transaction. As part of this transaction commit, all changed tree blocks (both leafs and index nodes) have to be written to disk. Thus, both leaf node A and leaf node B are to be written to disk because their contents have changed. However, writing leaf node B to disk is inefficient because it has only one key-value change but the whole leaf has to be written to disk. Writing leaf node A is more efficient because it carries more changed key-values than unchanged key-values.

Consider a large KV store carrying billions of key-value pairs being modified by application. It may happen that a transaction commit has to write a lot of changed leaf nodes to disk, but each changed leaf node has not changed much. Unfortunately, the result is that there could be a massive stream of writes to disk as part of the transaction commit. In can be desirable to be able to commit only a part of the KV store, the part that had accumulated "enough" changes. With the above-described model, this is not possible because a transaction must persist all the changed tree blocks to disk, regardless of the amount of changes in a particular tree block.

In one or more examples of the present disclosure, a KV store is structured as several low-level KV stores (hereafter "sub-KV stores") and a top-level KV store (hereafter "root of sub-KV stores"). Each sub-KV store is responsible for a particular range of keys and has its own running transaction. For example, the leftmost sub-KV store is responsible for keys from 0 to 9,999, the next sub-KV store is responsible for keys from 10,000 to 19,999, and so on. Such separation of key range into smaller ranges is called "sharding," and each sub-range and the corresponding sub-KV store are called a "shard."

The root of sub-KV stores also has its own running transaction. The root of sub-KV stores tracks the following information (super-block) about each sub-KV store.
1) The minimal key of the sub-KV store. This is what defines that range of keys that this sub-KV store is responsible for.
2) The last committed transaction for this sub-KV store.
3) The location of the root block of the sub-KV store on disk.

The super-block may include additional information as required by a particular implementation, such as checksum of the root block of the sub-KV store.

Figure 1:
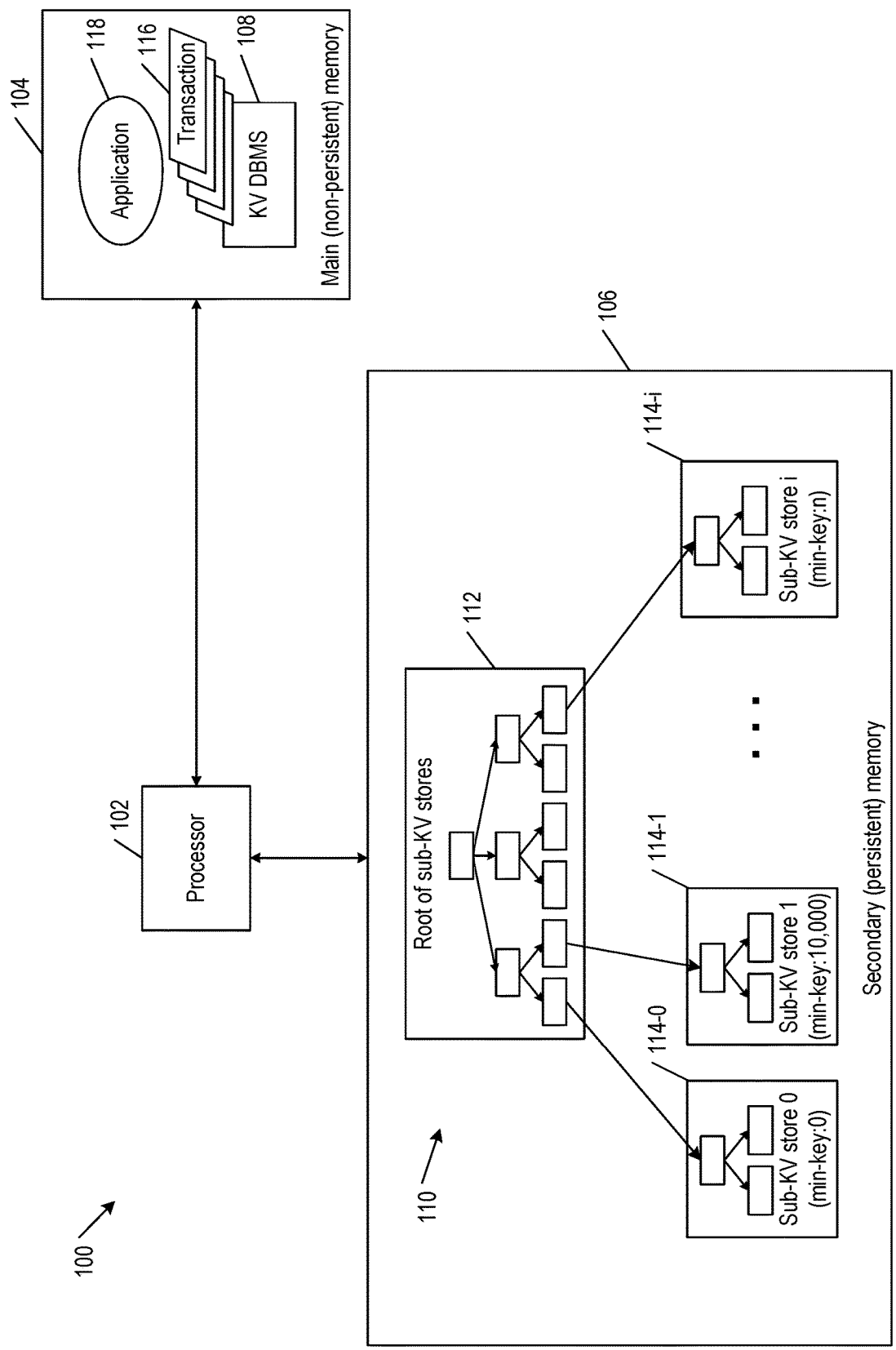
FIG. 1 is a storage system in some examples of the present disclosure.

FIG. 1 is a database system 100 in some examples of the present disclosure. System 100 includes a processor 102, a main (non-persistent) memory 104, and a secondary (persistent) memory 106.

Main memory 104 (e.g., random access memory) stores program instructions and data for a KV database management system (DBMS) 108 that manage a KV store 110 stored in secondary memory 106. KV store 110 encompasses a root of sub-KV stores 112 and a number of sub-KV stores, such as sub-KV stores 114-0, 114-1 . . . 104-i (collectively as "sub-KV stores 114" or as a generic individual "sub-KV store 114"). The root of sub-KV stores 112 and sub-KV stores 114 may be B-trees, red-black trees, AVL trees, or skip-list structures. In addition, sub-KV stores 114 may be a linked list or a simple sorted array. KV DBMS 108 tracks running transactions 116 for the root of sub-KV stores 112 and sub-KV stores 114. Note that "KV DBMS" and "KV store" are used interchangeably and they are often considered together as one entity. Optionally main memory 104 stores program instructions and data for an application 118 that accesses KV store 110. Alternatively application 118 may be located in another system connected by a network to storage system 100 to access KV store 110.

Secondary memory 106 (e.g., disk) stores data that form KV store 110, including data that form the root of sub-KV stores 112 and sub-KV stores 114. Alternatively the data that form the root of sub-KV stores 112 and sub-KV stores 114 may be located on different secondary memories. Processor 102, main memory 104, and secondary memory 106 may be a single server, or processor 102 and main memory 104 may be a server that accesses a secondary memory 106 that is a storage system, such as storage area network (SAN) or a network attached storage (NAS), over a network.

Figure 2:
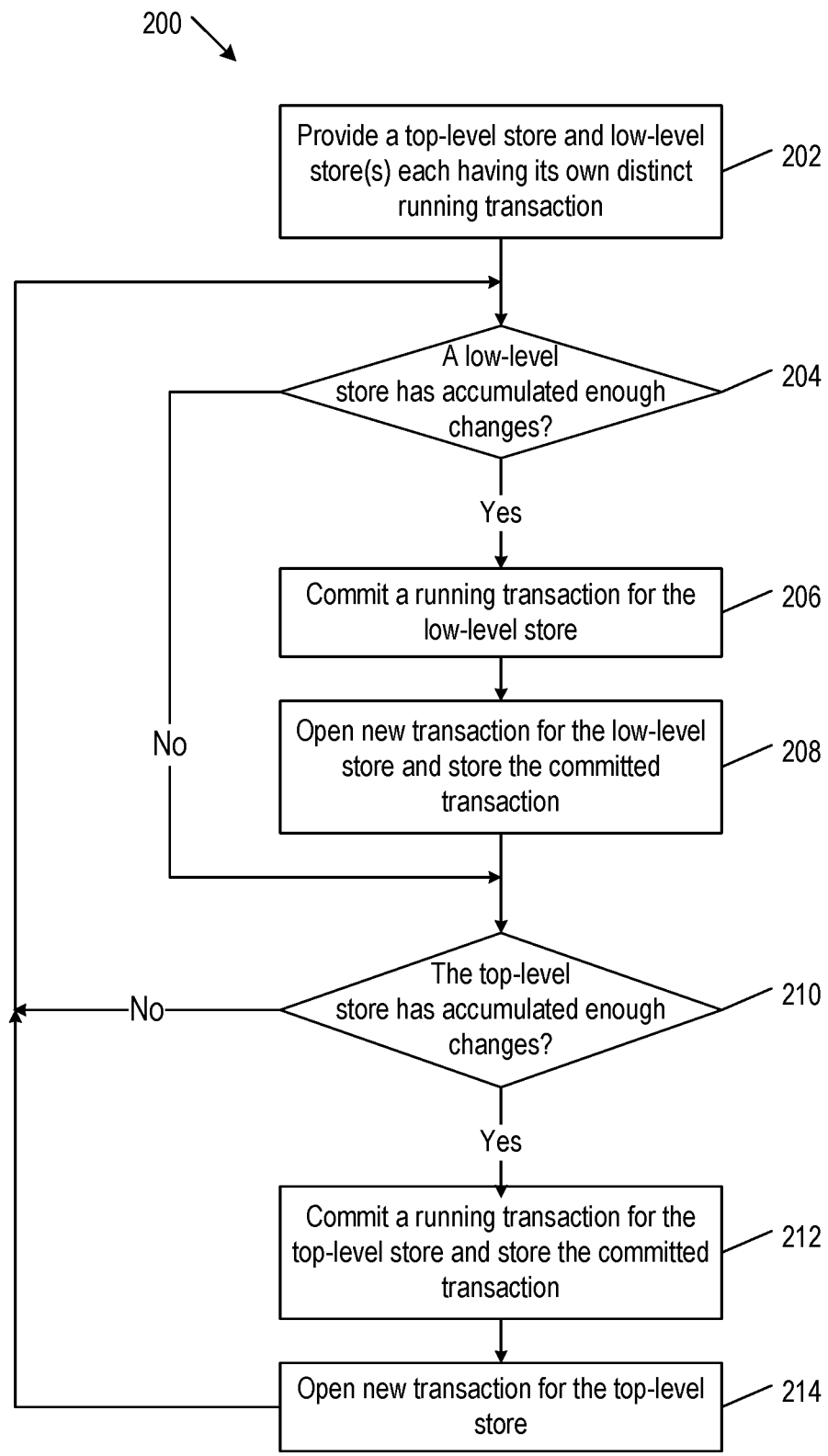
FIG. 2 is a flowchart of a method for a key-value (KV) database management system (DBMS) of FIG. 1 to provide a KV store to an application 118 in examples of the present disclosure.

FIG. 2 is a flowchart of a method 200 for KV DBMS 108 (FIG. 1) to provide KV store 110 (FIG. 1) to application 118 (FIG. 1) in examples of the present disclosure. Method 200, and other methods described herein, may include one or more operations, functions, or actions illustrated by one or more blocks. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Method 200 may start in a block 202.

In block 202, KV DBMS 108 provides the root of sub-KV stores 112 (FIG. 1) and one or more sub-KV stores 114 (FIG. 1) that form KV store 110. KV DBMS 108 assigns a distinct running transaction 116 (FIG. 1) to each store. Each sub-KV store 114 is responsible for a particular key range. Each sub-KV store 114 stores a number of key-value pairs. For example, each sub-KV store 114 may be a B+ tree having one or more leaf nodes each storing a key-value pair. The value in the key-value pair may be actual data or a pointer to the actual data.

The root of sub-KV stores 112 tracks the super-block of sub-KV stores 114. For example, the root of sub-KV stores 112 may be a B+ tree having zero or more index nodes and one or more leaf nodes where each leaf node stores information (a super-block) about a different sub-KV store. The information includes a minimum key of a sub-KV store 114, a last committed transaction for the sub-KV store (used for recovery with a journal), and a pointer to the sub-KV store (e.g., a location to the root node/block of the sub-KV store in secondary memory 106). Block 202 may be followed by block 204.

In block 204, KV DBMS 108 determines if any of sub-KV stores 114 has accumulated enough changes (e.g., a predetermined number of writes). If so, block 204 may be followed by block 206. Otherwise block 204 may be followed by block 210.

In block 206, KV DBMS 108 commits the running transaction of a particular sub-KV store 114 that has accumulated enough changes. KV DBMS 108 commits the running transaction by persisting changes made to this sub-KV store 114 during the running transaction to secondary memory 106 and updating the last committed transaction of the sub-KV store. As noted above, the last committed transaction of a sub-KV store is stored in a corresponding super-block maintained by the root of sub-KV store 112 (e.g., a leaf node of the root of sub-KV store 112) on secondary memory 106. Block 206 may be followed by block 208.

In block 208, KV DBMS 108 opens a new transaction for this particular sub-KV store 114. Blocks 206 and 208 may be repeated for each sub-KV store that has accumulated enough changes. Block 208 may be followed by block 210.

In block 210, KV DBMS 108 determines if the root of sub-KV stores 112 has accumulated enough changes. If so, block 210 may be followed by block 212. Otherwise block 210 may loop back to block 204.

In block 212, KV DBMS 108 commits the running transaction of the root of sub-KV stores 112. KV DBMS 108 commits the running transaction by persisting changes made to the root of sub-KV stores 112 during the running transaction to secondary memory 106 and updating the last committed transaction in the super-block of the root of sub-KV stores with the running transaction of the root of sub-KV stores. The super-block of the root of sub-KV store 112 carries information that allows parsing and validating of the root of sub-KV stores, including the last committed transaction, and is typically stored in a fixed location on secondary memory 106. Block 212 may be followed by block 214.

In block 214, KV DBMS 108 opens a new transaction for the root of sub-KV stores 112. Block 214 may loop back to block 204 to continue to commit the running transaction of any store that has accumulated enough changes.

The following example demonstrates method 200. Assume that sub-KV store 114-0 (FIG. 1) is responsible for the key range of [0, 9999] and has a running transaction T0, and sub-KV store 114-1 (FIG. 1) is responsible for the key range of [10000, 19999] and has a running transaction T1. Further assume that application 118 (FIG. 1) modifies 1,000 keys in the range [0, 9999] and 10 keys in the range [10000, 19999]. At this point, KV DBMS 108 (FIG. 1) determines sub-KV store 114-0 has accumulated enough changes for running transaction T0. KV DBMS 108 commits the running transaction T0 and writes the changed blocks in sub-KV store 114-0 to secondary memory 106 (FIG. 1). KV DBMS 108 updates the root of sub-KV stores 112 (FIG. 1) with new information about sub-KV store 114-0, such as the last committed transaction. However, KV DBMS 108 can hold running transaction T1 for sub-KV store 114-1 open for a longer time. This way, examples of the present disclosure avoids potential write amplification that would otherwise result from sub-KV store 114-1 writing nodes that carry small amount of changes.

Sub-KV stores 114 may have static key ranges where each sub-KV store 114 is assigned a portion of the entire key range. Typically, the key range is very large. For example, if a key is a 48-bit unsigned integer, the range of the keys would be [0, 281474976710655]. If the full key range is statistically sharded and each shard is limited to 10,000 keys, the KV store would end up with more than 28 billion shards. On another hand, the maximal number of key-value pairs that a KV store is expected to manage at any given time is typically much smaller than the number of keys in the full key range. For example, a KV store can be expected to manage maximum 16 billion keys. Creating 28 billion static shards for the full key range in such situation is impractical, as most of the sub-KV stores would be empty.

In examples of the present disclosure, KV DBMS 108 creates and deletes sub-KV stores dynamically as keys-value pairs are inserted and removed. KV DBMS 108 maintains the amount of keys in each sub-KV-store within certain limits. KV DBMS 108 creates and deletes sub-KV stores to adhere to these limits, thereby controlling the total number of shards.

Figure 3:
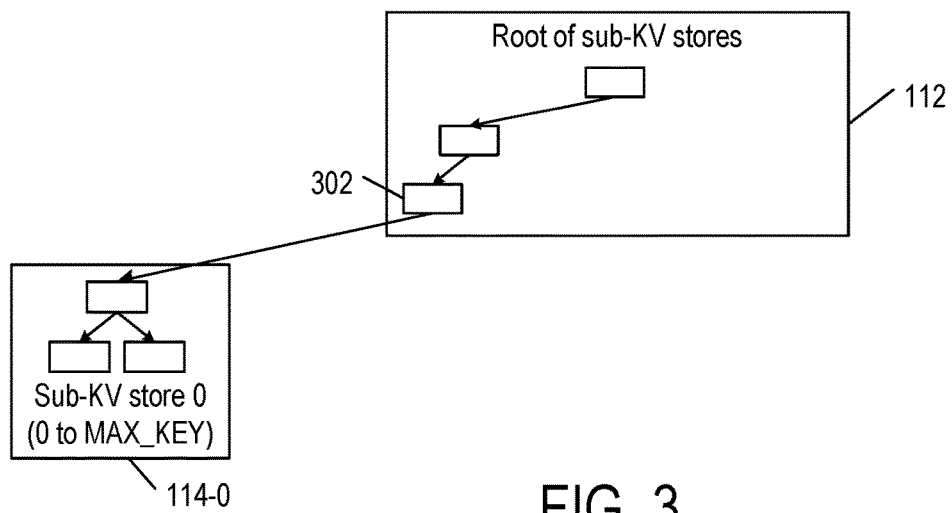
FIGS. 3 to 6 demonstrate the KV DBMS of FIG. 1 implementing dynamic key range for sub-KV stores in examples of the present disclosure.

FIGS. 3 to 6 demonstrate KV DBMS 108 (FIG. 1) implementing dynamic key range for sub-KV stores 114 (FIG. 1) in examples of the present disclosure. In FIG. 3, when KV store 110 is empty, KV DBMS 108 creates the root of sub-KV stores 112 having information (super-block) leading to an empty sub-KV store 114-0 (e.g., a leaf node 302 pointing to an empty sub-KV store 114-0), which is responsible for the entire range of keys [0, MAX_KEY] and therefore has a minimum key of 0.

Figure 4:
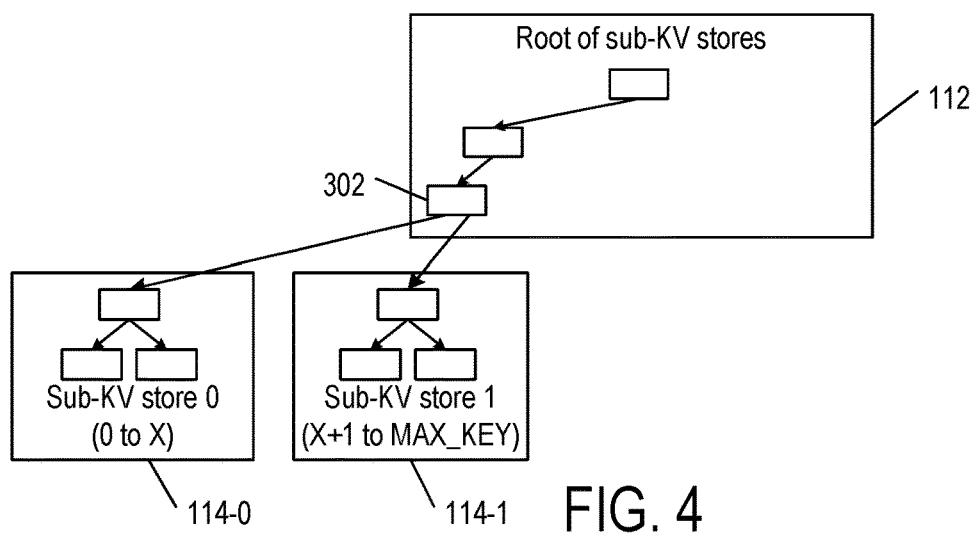

In FIG. 4, sub-KV store 114-0 reaches an upper threshold so KV DBMS 108 splits the sub-KV store 114-0 into two sub-KV stores (existing sub-KV store 114-0 and a new sub-KV store 114-1) where each has approximately half of the keys originally in sub-KV store 114-0. Thus, sub-KV store 114-0 becomes responsible for a range of keys [0, X] and has a minimum key of 0, and sub-KV store 114-1 becomes responsible for a range of keys [X+1, MAX_KEY] and has a minimum key of X+1. Note that when the root of sub-KV stores 112 is implemented as a B+ tree, one leaf node 302 may have information (super-blocks) leading to both sub-KV stores 114-0 and 114-1 or two leaf nodes may each have information (super-block) leading to one of the two sub-KV stores. In other words, a leaf in a B+ tree can carry information about several superblocks.

Figure 5:
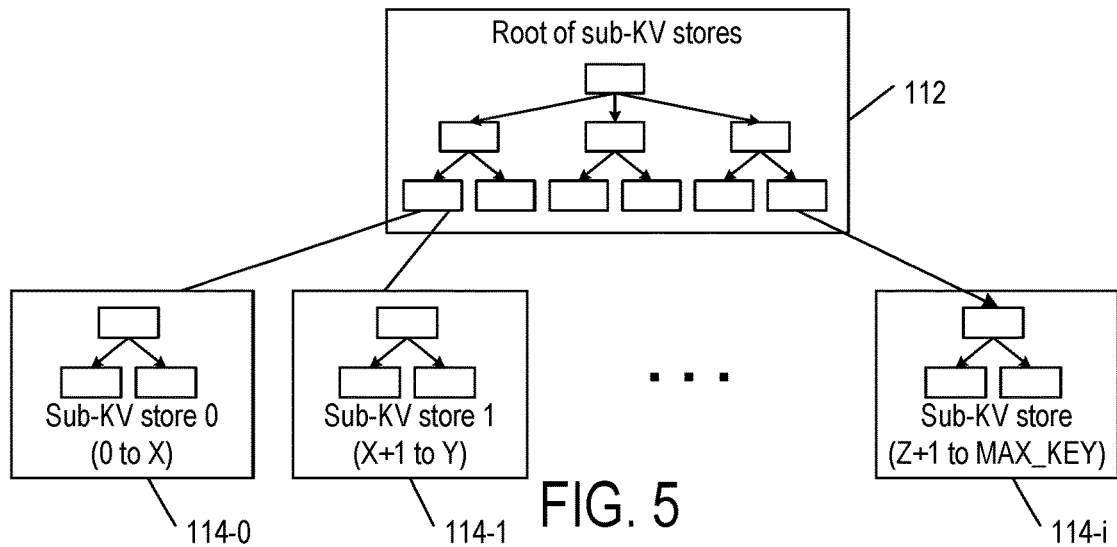

In FIG. 5, more key-value insertions cause additional sub-KV stores 114 to split. For example, sub-KV store 114-1 is split into two sub-KV stores where each has approximately half of the keys originally in sub-KV store 114-1. Sub-KV store 114-1 becomes responsible for a range of keys [X+1 to Y] but continues to have a minimum key of X+1. As new sub-KV stores are created, KV DBMS 108 updates the super-blocks in the root of sub-KV stores 112.

Figure 6:
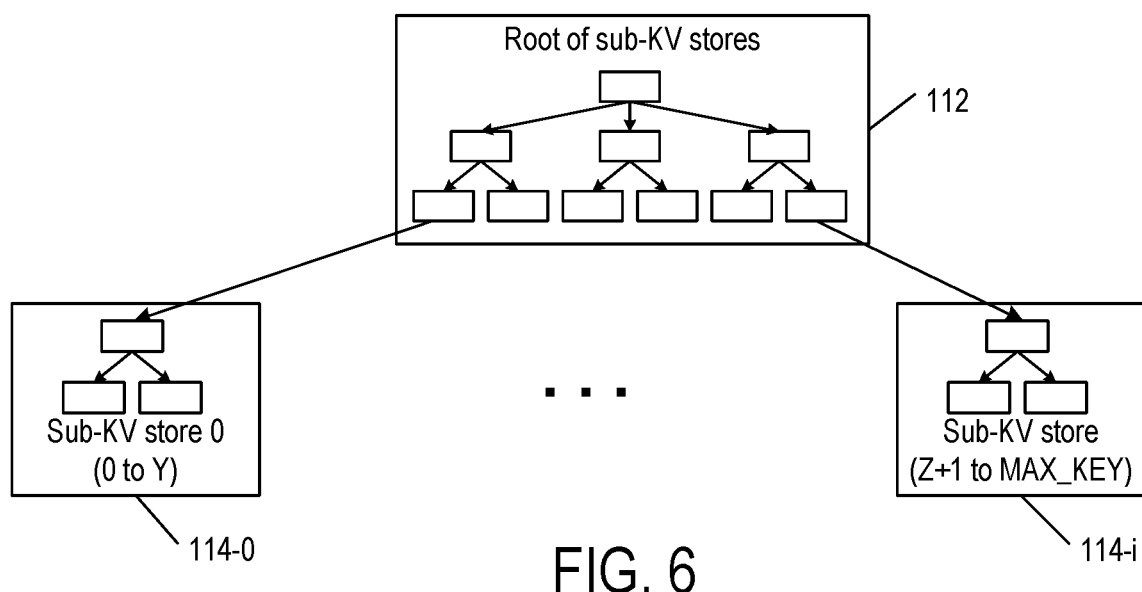

With key-value deletions, sub-KV stores 114 may have reduced numbers of keys. In FIG. 6, assume the total number of keys in a sub-KV store and its adjacent sub-KV store (right or left) are less than a lower threshold (e.g., sub-KV stores 114-0 and 114-1), KV DBMS 108 merges the two sub-KV stores by taking the key-value pairs of one sub-KV store (e.g., the right sub-KV store 114-1) and merge them into the other sub-KV store (e.g., the left sub-KV store 114-0). Sub-KV store 114-0 is now responsible for a range of keys [0 to Y] but continues to have a minimum key of 0. With constant splitting and merging, KV DBMS 108 prevents the number of sub-KV stores 114 from exceeding a defined value for a given key range. Based on the expected maximum number of key-value pairs for KV store 110, the maximal number of shards may be targeted manually by a user or automatically by KV DBMS 108. When the number of shards is close to the targeted maximum number of shards, KV DBMS 108 may merge the shards more aggressively to avoid overshooting the target number. For example, KV DBMS 108 may raise the lower thresholds to merge shards earlier.

Figure 7:
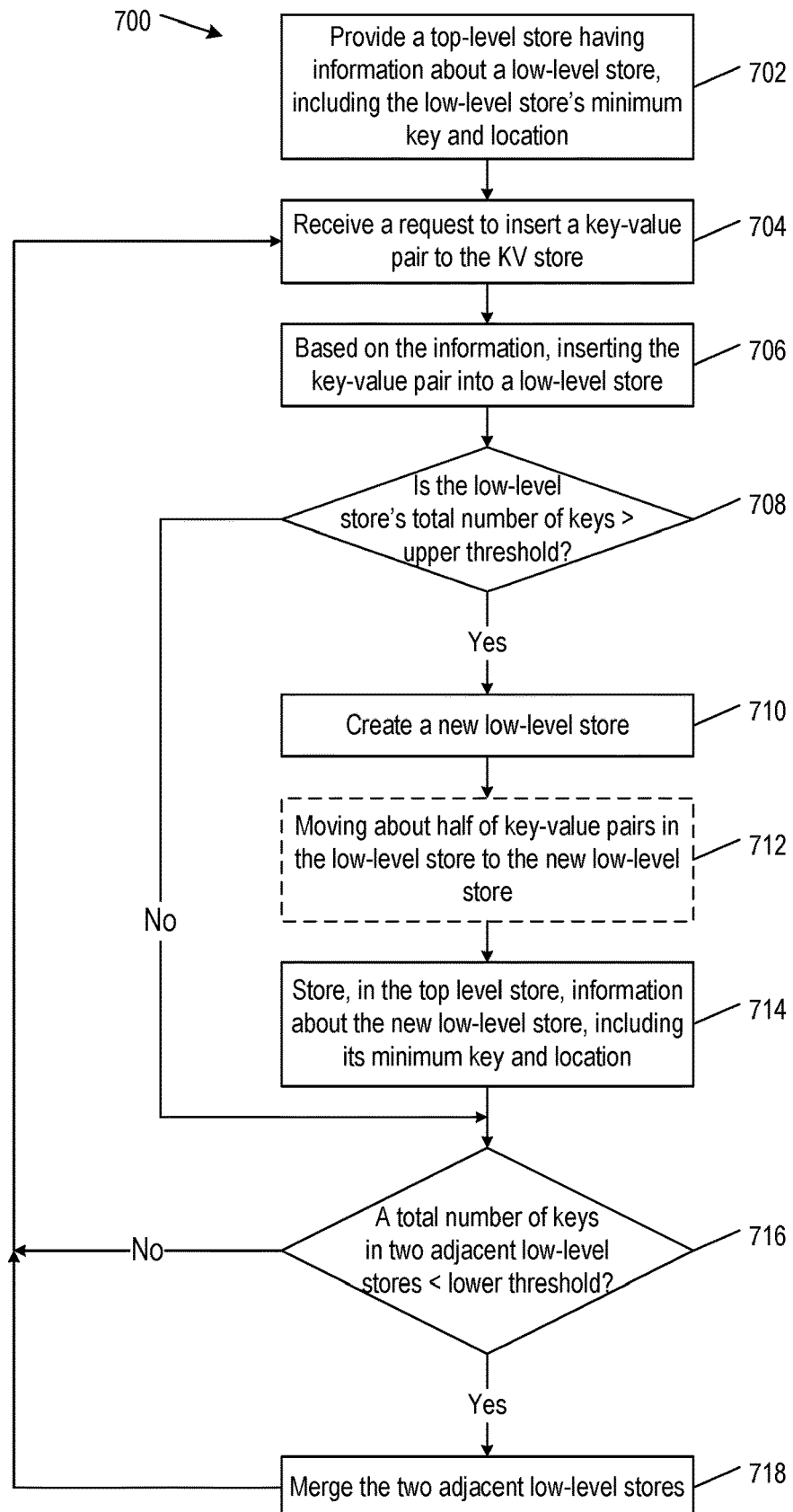
FIG. 7 is a flowchart of a method for the KV DBMS of FIG. 1 to create and delete sub-KV stores dynamically in examples of the present disclosure.

FIG. 7 is a flowchart of a method 700 for KV DBMS 108 (FIG. 1) to create and delete sub-KV stores 114 (FIG. 1) dynamically in examples of the present disclosure. Method 700 may start in a block 702.

In block 702, KV DBMS 108 provides a root of sub-KV stores 112 (FIG. 1) and a sub-KV store (e.g., sub-KV store 114-0 in FIG. 1). The root of sub-KV stores 112 has information (e.g., a super-block stored in a leaf node) that lead to sub-KV store 114-0. The information (super-block) includes a minimum key of sub-KV store 114-0, a last committed transaction for the sub-KV store, and a pointer to the sub-KV store (e.g., a location to the root node/block of the sub-KV store in secondary memory 106). Sub-KV store 114-0 is initially responsible for the entire range of keys [0, MAX_KEY] and has a minimum key of 0. Block 702 may be followed by block 704.

In block 704, KV DBMS 108 receives a request to insert a key-value pair into KV store 110 (FIG. 1). Block 704 may be followed by block 706.

In block 706, based on the information about sub-KV store(s) 114, KV DBMS 108 inserts the key-value pair into a sub-KV store 114 assigned to a range of keys including the key in the key-value pair. For example, KV DBMS 108 maintains information (e.g., a super-block) for each sub-KV store 114 in the root of sub-KV stores 112, and each super-block stores a minimum key of a sub-KV store and a pointer to the sub-KV store. When the root of sub-KV store 112 is implemented as a B+ tree, KV DBMS 108 may store the super-blocks in leaf nodes of the root of sub-KV store and create upper tree blocks in the root of sub-KV stores to track the super-blocks of each sub-KV store 114. By traversing the root of sub-KV stores 112, KV DBMS 108 finds the appropriate sub-KV store 114 to insert a key-value pair. Block 706 may be followed by block 708.

In block 708, KV DBMS 108 determines if the number of keys in the sub-KV store 114 that received the key-value insertion is greater than an upper threshold. If so, block 708 may be followed by block 710. Otherwise block 708 may be followed by block 716.

In block 710, KV DBMS 108 creates a new sub-KV store 114. Block 710 may be followed by optional block 712.

In optional block 712, KV DBMS 108 splits the sub-KV store 114 that is over the upper threshold by moving about half of its key-value pairs to the new sub-KV store 114. Optional block 712 is not used when keys increment monotonically and new key-value pairs are inserted into the newly created sub-KV store 114. Optional block 712 may be followed by block 714.

In block 714, KV DBMS 108 stores information about the new sub-KV store 114 in the root of sub-KV stores 112. For example when the root of sub-KV store 112 is implemented as a B+ tree, KV DBMS 108 creates a leaf node in the root of sub-KV stores to store a minimum key of the new sub-KV store 114, a last committed transaction for the new sub-KV store, and a pointer to the new sub-KV store. When a sub-KV store 114 is split, the minimum key for the new sub-KV store 114 would be the first key in the new sub-KV store. When monotonically incrementing keys, the minimum key for the new sub-KV store 114 would be the key following the last key in the sub-KV store 114 that exceeds the upper threshold. KV DBMS 108 also updates the upper tree nodes in the root of sub-KV stores 112, such as promoting the new sub-KV store's minimum key to a parent index node and splitting the parent node as needed. Block 714 may be followed by block 716.

In block 716, KV DBMS 108 determines if a total number of keys of two adjacent sub-KV stores 114 is less than a lower threshold. If so, block 716 may be followed by block 718. Otherwise block 716 loops back to block 704 to process any additional key-value insertion.

In block 718, KV DBMS 108 merges the two adjacent sub-KV stores 114 into one sub-KV store 114 and deletes the other sub-KV store 114. For example, KV DBMS 108 moves key-value pairs from the sub-KV store 114 on the right into the sub-KV store 114 on the left, and deletes the sub-KV store 114 on the right. When the root of sub-KV store 112 is implemented as a B+ tree, KV DBMS 108 also deletes the leaf node for the deleted sub-KV store 114 in the root of sub-KV stores and updates the upper tree nodes in the root of sub-KV stores, such as deleting the deleted sub-KV store's minimum key from a parent index node and merging the parent node with another parent node as needed. Block 718 may loop back to block 704 to process any additional key-value insert.

Figure 8:
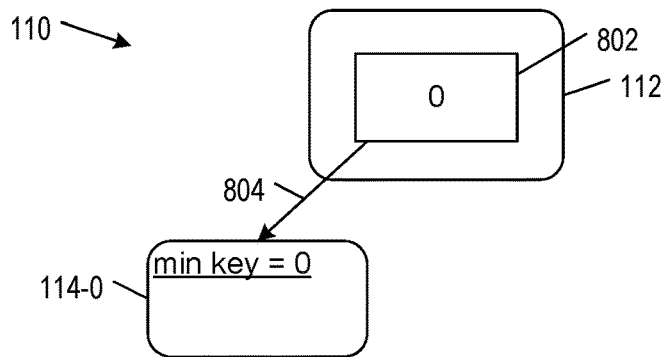
FIGS. 8 to 13 demonstrate the method of FIG. 7 in an example of the present disclosure.

FIGS. 8 to 13 demonstrate method 700 in an example of the present disclosure. Assume each sub-KV store is limited to 10 keys and each key is a 32-bit unsigned integer. In FIG. 8, KV DBMS 108 provides an empty KV store 110 having a root of sub-KV stores 112 and a sub-KV store 114-0 covering the whole key range. The root of sub-KV stores 112 has a leaf node 802 (also the root node) storing a minimum key 0 of sub-KV store 114-0 and a pointer 804 to sub-KV store 114-0. For simplicity, tree structures of sub-KV stores 114 are not illustrated.

Figure 9:
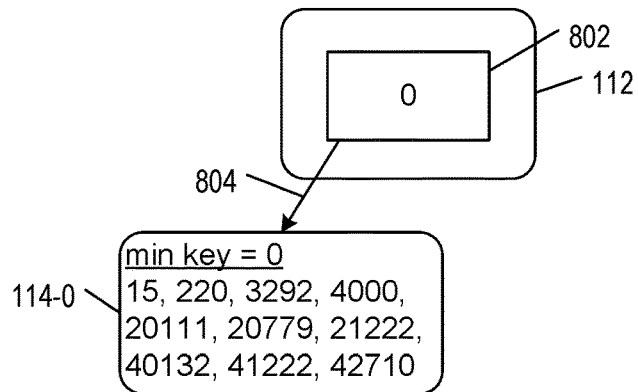
Figure 10:
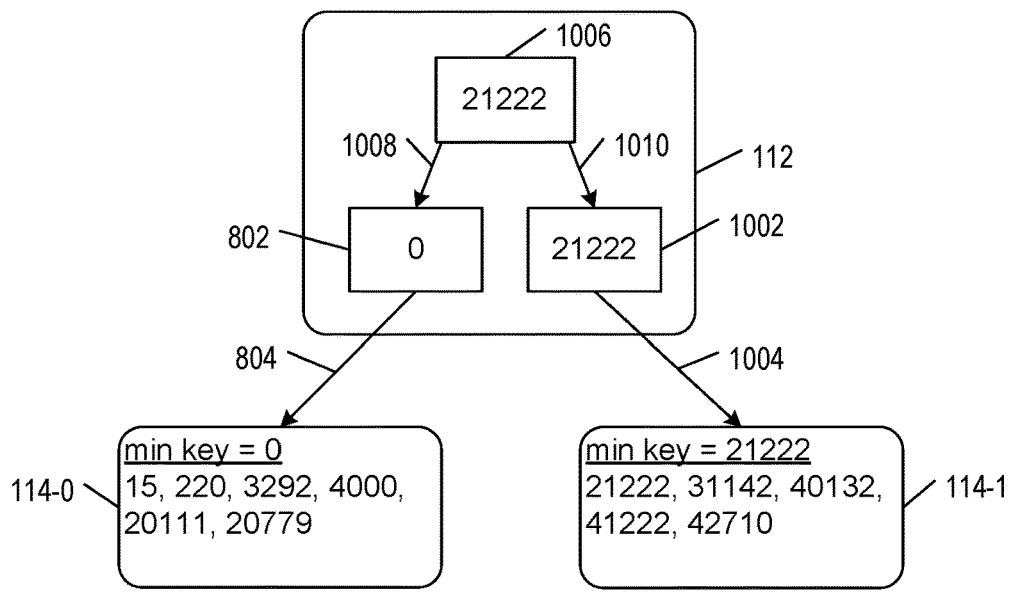

Assume the following 10 key-pair values (represented simply by their keys) are inserted into KV store 110: 20779, 15, 220, 3292, 40132, 42710, 4000, 20111, 21222, and 41222. In FIG. 9, KV DBMS 108 inserts the 10 key-value pairs into sub-KV store 114-0, which are arranged sequentially in sub-KV store 114-0.

Assume five (5) more key-value pairs (represented simply by their keys) are inserted into KV store 110 in the following order: 31142, 6469, 25000, 6754, and 33732. When key 31142 is inserted into sub-KV store 114-0, it becomes greater than the upper threshold. As a result, in FIG. 10, KV DBMS 108 splits sub-KV store 114-0 into two sub-KV stores by creating a new sub-KV store 114-1 and moving about half of the key-value pairs in sub-KV store 114-0 into the new sub-KV store 114-1. Specifically, KV DBMS 108 moves 21222, 31142, 40132, 41222, and 42710 to the new sub-KV store 114-1. KV DBMS 108 also updates the root of sub-KV stores 112 by creating a new leaf node 1002 that stores a minimum key 21222 of sub-KV store 114-1 and a pointer 1004 to sub-KV store 114-1. KV DBMS 108 may also create an index node 1006 (also the root node) storing, the minimum key 21222, a pointer 1008 to sub-KV store 114-0 for keys greater or equal to 0 and less than the minimum key 21222, and a pointer 1010 to sub-KV store 114-1 for keys equal to or greater than the minimum key 21222. In index node 1006, the minimum key 21222 is stored to the right of pointer 1008, and pointer 1010 is stored to the right of minimum key 21222.

Figure 11:
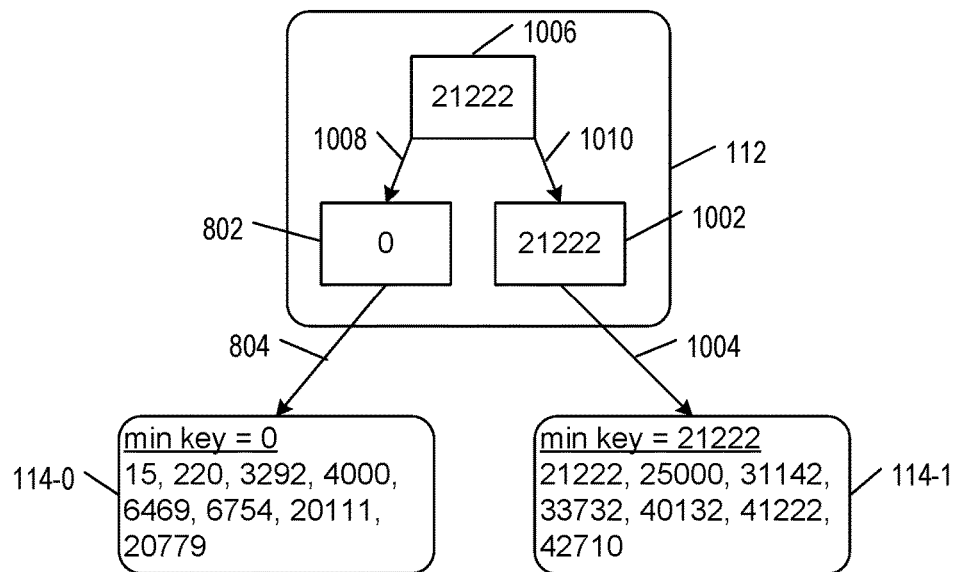
Figure 12:
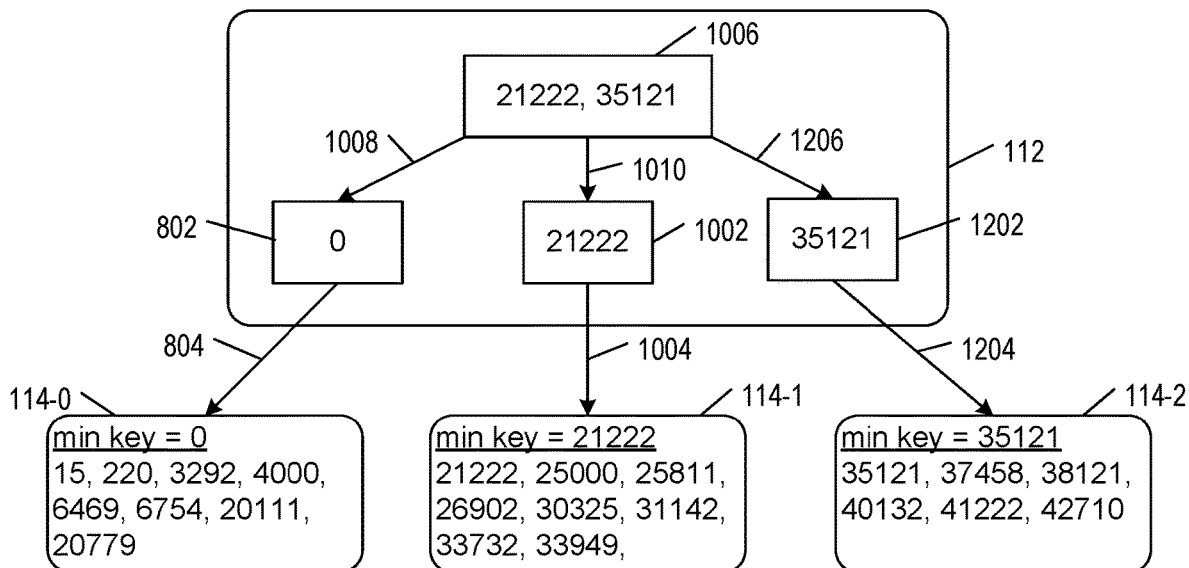

In FIG. 11, KV DBMS 108 continues to insert the remaining four (4) keys with keys 6469 and 6754 inserted into sub-KV store 114-0, and keys 25000 and 33732 inserted into sub-KV store 114-1.

Assume seven (7) more key-value pairs (represented simply by their keys) are inserted into KV store 110 in the following order: 25811, 26902, 37458, 35121, 38121, 33949, and 30325. When keys 25811, 26902, 37458, 35121 are inserted into sub-KV store 114-1, it becomes greater than the upper threshold (10). As a result, in FIG. 12, KV DBMS 108 splits sub-KV store 114-1 into two sub-KV stores by creating a new sub-KV store 114-2 and moving about half of the key-value pairs in sub-KV store 114-1 to new sub-KV store 114-2. Specifically, KV DBMS 108 moves keys 35121, 37458, 40132, 41222, and 42170 to new sub-KV store 114-2. KV DBMS 108 also updates the root of sub-KV stores 112 by creating a new leaf node 1202 that stores a minimum key 35121 of sub-KV store 114-2 and a pointer 1204 to sub-KV store 114-2. KV DBMS 108 may also update index node 1006 by adding the minimum key 35121 and a pointer 1206 to sub-KV store 114-2 for keys equal to or greater than the minimum key 35121. Note that pointer 1010 now direct keys that are equal to or greater than the minimum key 21222 but less than the minimum key 35121. In index node 1006, the minimum key 35121 is stored to the right of pointer 1010, and pointer 1206 may be stored on the right of the minimum key 35121.

Figure 13:
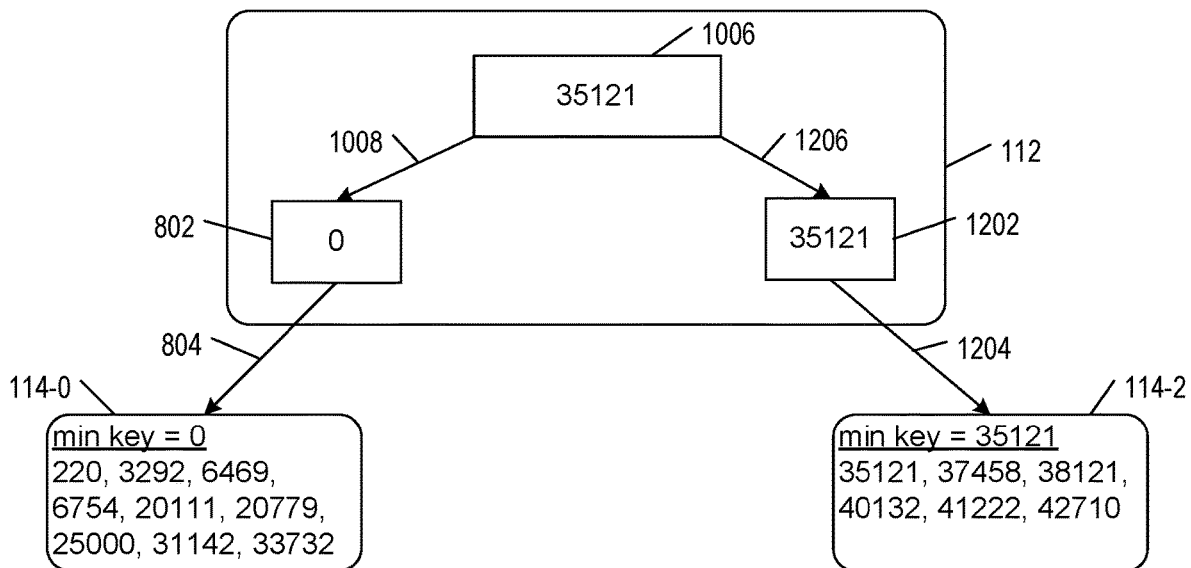

Now assume seven (7) key-value pairs (represented simply by their keys) are deleted: 30325, 26902, 15, 4000, 25811, 33949, and 21222. When these keys are deleted, the total number of keys in sub-KV stores 114-0 and 114-1 become less than a lower threshold (e.g., 10 keys). In FIG. 13, KV DBMS 108 merges sub-KV stores 114-0 and 114-1 by moving keys 25000, 31142, and 33732 from sub-KV store 114-1 into sub-KV store 114-0. KV DBMS 108 also updates the root of sub-KV stores 112 by deleting leaf node 1002, and the minimum key 21222 and pointer 1010 from index node 1006. In index node 1006, the minimum key 35121 is stored to the right of pointer 1008, and pointer 1206 is stored to the right of minimum key 35121.

Figure 14:
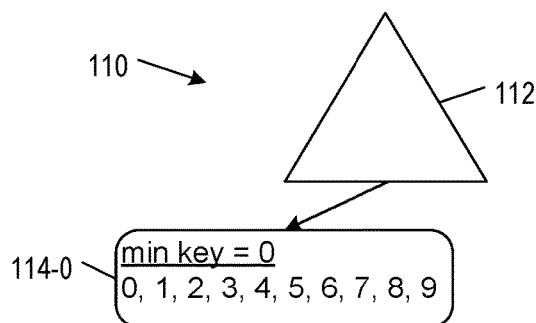
FIGS. 14 to 16 demonstrate the method of FIG. 7 in another example of the present disclosure.
Figure 15:
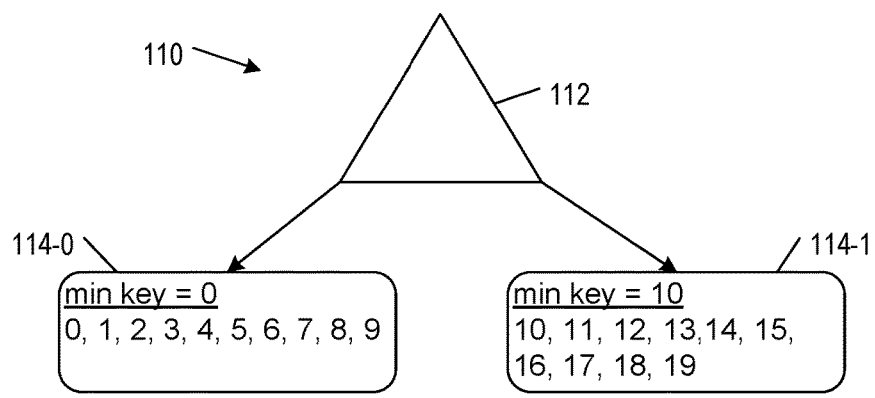
Figure 16:
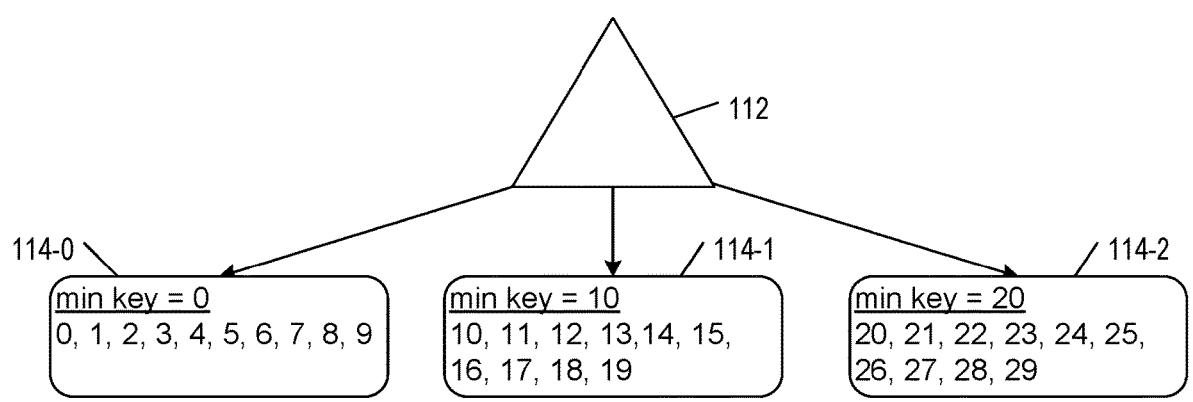

FIGS. 14 to 16 demonstrate method 700 in an example of the present disclosure where keys monotonically increment. Assume each sub-KV store is limited to 10 keys and each key is a 32-bit unsigned integer. In FIG. 14, KV DBMS 108 provides a KV store 110 having a root of sub-KV stores 112 and a sub-KV store 114-0 covering the whole key range. For simplicity, tree structures of the root of sub-KV stores 112 and sub-KV stores 114 are not illustrated.

Assume 10 key-pair values (represented simply by their keys 0 to 9) are inserted into KV store 110. KV DBMS 108 inserts the 10 key-value pairs into sub-KV store 114-0, which are arranged sequentially in sub-KV store 114-0.

Assume 10 more key-pair values (represented simply by their keys 10 to 19) are inserted into KV store 110. In FIG. 15, KV DBMS 108 creates a new sub-KV store 114-1 and inserts the additional 10 key-value pairs into sub-KV store 114-1, which are arranged sequentially in sub-KV store 114-1.

Assume 10 more key-pair values (represented simply by their keys 20 to 29) are inserted into KV store 110. In FIG. 16, KV DBMS 108 creates a new sub-KV store 114-2 and inserts the additional 10 key-value pairs into sub-KV store 114-2, which are arranged sequentially in sub-KV store 114-2.

It is assumed that there is no particular order in which key-value pairs are removed from KV store 110 even though they were inserted with monotonically incrementing keys. Therefore, the merging of sub-KV stores 114 would occur as described in the preceding example.

Various other adaptations and combinations of features of the embodiments disclosed are within the scope of the invention. Numerous embodiments are encompassed by the following claims.

The invention claimed is:

1. A method for a key-value (KV) store database management system (DBMS) to provide a KV store to an application, comprising:
    providing a plurality of low-level stores and a top-level store, wherein:
        each of the plurality of low-level stores includes key-value pairs and has a respective low-level running transaction accumulating a plurality of changes to the key-value pairs of the low-level store; and
        the top-level store includes for each of the plurality of low-level stores information leading to the respective low-level store and information indicating which respective low-level running transaction was last committed in the low-level store, and has a top-level running transaction, distinct of a plurality of low-level running transactions of the plurality of low-level stores, accumulating a plurality of changes to the information indicating which respective low-level running transaction was last committed to a low-level store of the plurality of low-level stores; and
    in response to a plurality of changes made to a plurality of key-value pairs in at least two of the plurality of low-level stores, such that each of the respective at least two low-level transactions of the at least two low-level stores accumulate some of the plurality of changes:
        committing the respective low-level running transaction of one of the at least two low-level stores, without committing another respective low-level transaction of another of the at least two low-level stores to reduce an amount of writes to secondary memory, comprising:
            persisting changes to the one low-level store accumulated by the respective low-level running transaction to secondary memory; and
            updating the top-level store to indicate the respective low-level running transaction was last committed in the one low-level store; and
        after committing the respective low-level running transaction of the one low-level store, opening a new respective low-level running transaction for the one low-level store.

2. The method of claim 1, further comprising determining the one low-level store has accumulated a first number of changes, wherein said committing the respective low-level running transaction for the one low-level store occurs in response to said determining the one low-level store has accumulated the first number of changes.

3. The method of claim 2, further comprising:
    determining the top-level store has accumulated a second number of changes to the information indicating which respective low-level running transaction was last committed to the low-level store; and
    in response to said determining the top-level store has accumulated the second number of changes:
        committing the top-level running transaction, and
        opening a new top-level running transaction for the top-level store.

4. The method of claim 3, wherein said committing the top-level running transaction comprises:
    persisting changes to the top-level store accumulated by the top-level running transaction to secondary memory; and
    updating the top-level store to indicate the top-level running transaction was last committed in the top-level store.

5. The method of claim 1, wherein the top-level store includes leaf nodes each pointing to one of the plurality of low-level stores.

6. The method of claim 5, wherein the top-level store further includes a root node pointing to one or more index nodes, each index node pointing to one or more of: one of the leaf nodes and another index node.

7. A database system, comprising:
    processor, main memory, and secondary memory implementing:
        a plurality of low-level stores, each including key-value (KV) pairs and having a respective low-level running transaction accumulating a plurality of changes to the key-value pairs of the low-level store; and
        a top-level store including for each of the plurality of low-level stores information leading to the respective low-level store and information indicating which respective low-level running transaction was last committed in the low-level store, and has a top-level running transaction, distinct of a plurality of low-level running transactions of the plurality of low-level stores, accumulating a plurality of changes to the information indicating which respective low-level running transaction was last committed to a low-level store of the plurality of low-level stores; and
        a KV store database management system (DBMS) configured to:
            in response to a plurality of changes made to a plurality of key-value pairs in at least two of the plurality of low-level stores, such that each of the respective at least two low-level transactions of the at least two low-level stores accumulate some of the plurality of changes:

commit the respective low-level running transaction of one of the at least two low-level stores, without committing another respective low-level transaction of another of the at least two low-level stores to reduce an amount of writes to secondary memory, by:
  persisting changes to the one low-level store accumulated by the respective low-level running transaction to secondary memory; and
  updating the top-level store to indicate the respective low-level running transaction was last committed in the one low-level store; and
after committing the respective low-level running transaction of the one low-level store, open a new respective low-level transaction for the one low-level store.

8. The system of claim 7, wherein the KV store DBMS is further configured to determine the one low-level store has accumulated a first number of changes, wherein said commit the respective low-level running transaction of the one low-level store occurs in response to said determine the one low-level store has accumulated at least the first number of changes.

9. The system of claim 8, wherein the KV store DBMS is further configured to:
  determine the top-level store has accumulated a second number of changes to the information indicating which respective low-level running transaction was last committed to the low-level store; and
  in response to said determine the top-level store has accumulated at least the second number of changes:
    commit the top-level running transaction, and
    open a new top-level transaction for the top-level store.

10. The system of claim 9, wherein said commit the top-level running transaction comprises:
  persisting changes to the top-level store accumulated by the top-level running transaction to secondary memory; and
  updating the top-level store to indicate the top-level running transaction was last committed in the top-level store.

11. The system of claim 7, wherein the top-level store includes leaf nodes each pointing to one of the plurality of low-level stores.

12. The system of claim 11, wherein the top-level store further includes a root node pointing to index nodes, each index node pointing to one or more of: one of the leaf nodes and another index node.

13. A non-transitory, computer-readable storage medium encoded with instructions executable by a processor to implement a key-value (KV) store database management system (DBMS) to provide a KV store to an application, the instructions comprising:
  provide a plurality of low-level stores and a top-level store, wherein:
    each of the plurality of low-level stores includes key-value pairs and has a respective low-level running transaction accumulating a plurality of changes to the key-value pairs of the low-level store; and
    the top-level store includes for each of the plurality of low-level stores information leading to the respective low-level store and information indicating which respective low-level running transaction was last committed in the low-level store, and has a top-level running transaction, distinct of a plurality of low-level running transactions of the plurality of low-level stores, accumulating a plurality of changes to the information indicating which respective low-level running transaction was last committed to a low-level store of the plurality of low-level stores; and
  in response to a plurality of changes made to a plurality of key-value pairs in at least two of the plurality of low-level stores, such that each of the respective at least two low-level transactions of the at least two low-level stores accumulate some of the plurality of changes:
    commit the respective low-level running transaction of one of the at least two low-level stores, without committing another respective low-level transaction of another of the at least two low-level stores to reduce an amount of writes to secondary memory, comprising:
      persisting changes to the one low-level store accumulated by the respective low-level running transaction to secondary memory; and
      updating the top-level store to indicate the respective low-level running transaction was last committed in the one low-level store; and
    after committing the respective low-level running transaction of the one low-level store, opening a new respective low-level running transaction for the one low-level store.

14. The storage medium of claim 13, wherein the instructions further comprise determine the one low-level store has accumulated a first number of changes, wherein said commit the respective low-level running transaction of the one low-level store occurs in response to said determine the one low-level store has accumulated at least the first number of changes.

15. The storage medium of claim 14, wherein the instructions further comprise:
  determine the top-level store has accumulated a second number of changes to the information indicating which respective low-level running transaction was last committed to the low-level store; and
  in response to said determine the top-level store has accumulated at least the second number of changes:
    commit the top-level running transaction, and
    open a new top-level running transaction for the top-level store.

16. The storage medium of claim 15, wherein said commit the top-level running transaction comprises:
  persisting changes to the top-level store accumulated by the top-level running transaction to secondary memory; and
  updating the top-level store to indicate the last top-level running transaction was last committed transaction in the top-level store.

17. The storage medium of claim 13, wherein the top-level store includes leaf nodes each pointing to one of the plurality of low-level stores.

18. The storage medium of claim 17, wherein the top-level store further includes a root node pointing to index nodes, each index node pointing to one or more of: one of the leaf nodes and another index node.

* * * * *